(12) United States Patent  
Beasley et al.

(10) Patent No.: US 7,627,982 B2
(45) Date of Patent: Dec. 8, 2009

(54) PLANT WATERING AND FEEDING DEVICE

(76) Inventors: James Desmond Beasley, 112 Baynes St., Terang, VIC (AU) 3624; James Robert Beasley, 112 Baynes St., Terang, VIC (AU) 3624

(*) Notice: Subject to any disclaimer, the term of this patent is extended or adjusted under 35 U.S.C. 154(b) by 594 days.

(21) Appl. No.: 11/568,062

(22) PCT Filed: May 11, 2005

(86) PCT No.: PCT/AU2005/000671

§ 371 (c)(1), (2), (4) Date: Oct. 18, 2006

(87) PCT Pub. No.: WO2005/107435

PCT Pub. Date: Nov. 17, 2005

(65) Prior Publication Data

US 2009/0217578 A1 Sep. 3, 2009

(30) Foreign Application Priority Data

May 11, 2004 (AU) ............................... 2004902496

(51) Int. Cl.
*A01G 29/00* (2006.01)
(52) U.S. Cl. ....................................................... 47/48.5
(58) Field of Classification Search . 47/48.5; *A01G 29/ 00*
See application file for complete search history.

(56) References Cited

U.S. PATENT DOCUMENTS

| 3,345,774 | A | * | 10/1967 | Delbuguet | 47/48.5 |
|---|---|---|---|---|---|
| 3,373,525 | A | | 3/1968 | Cavataio | |
| 4,745,706 | A | | 5/1988 | Muza et al. | |
| 5,067,274 | A | | 11/1991 | Lewis | |
| 5,279,073 | A | * | 1/1994 | Czebieniak | 47/48.5 |
| 5,806,240 | A | * | 9/1998 | Racine | 47/79 |
| 5,901,497 | A | | 5/1999 | Bulvin | |
| 6,076,300 | A | * | 6/2000 | Cronin | 47/48.5 |
| 6,185,866 | B1 | * | 2/2001 | Enfaradi | 47/79 |
| D466,379 | S | | 12/2002 | Barbi et al. | |

FOREIGN PATENT DOCUMENTS

| AU | 199947589 A | 4/2001 |
|---|---|---|
| FR | 2654301 A | 5/1991 |
| FR | 2735653 A | 12/1996 |
| FR | 2797146 A | 2/2001 |

* cited by examiner

*Primary Examiner*—Son T Nguyen
*Assistant Examiner*—Shadi Baniani
(74) *Attorney, Agent, or Firm*—David A. Guerra

(57) ABSTRACT

A plant and watering and feeding device (10) including an elongate tubular body having an upper portion (38) and a lower portion (16), said elongate tubular body having a hollow cavity for receiving water and feed therein, said upper portion (38) having an opening (14) in fluid communication with said hollow cavity for supplying said water and feed into said device (10), said lower portion (16) having a plurality of apertures (18) in fluid communication with said hollow cavity and the exterior of said device (10), wherein said device (10) is positionable relative to a plant such that said lower portion (16) of said device (10) is surrounded by soil proximate the roots of said plant, and wherein said water and feed may be introduced into said device (10) through said opening (14) and subsequently slowly released into said soil proximate said roots of said plant via said apertures (18).

2 Claims, 2 Drawing Sheets

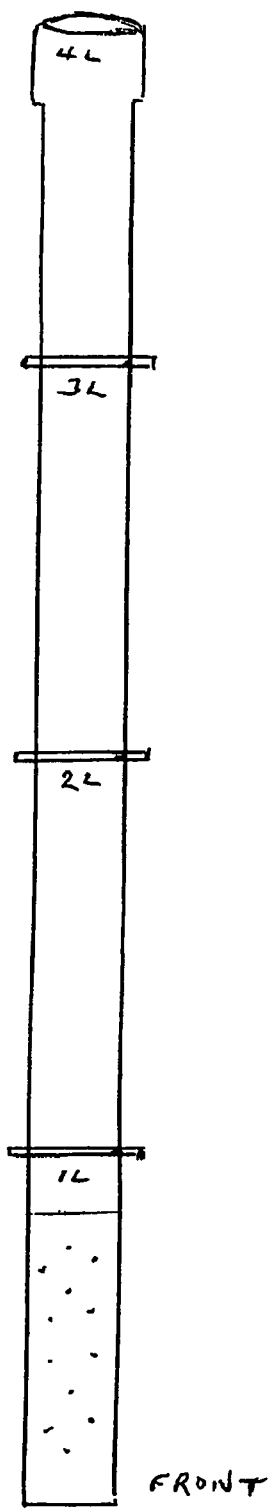
FRONT VIEW
FIG 1
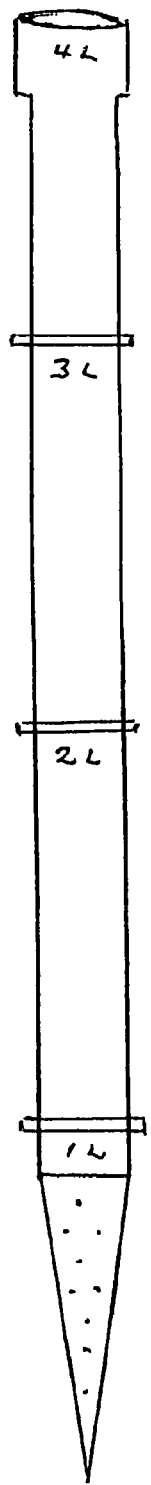
SIDE VIEW
FIG 2
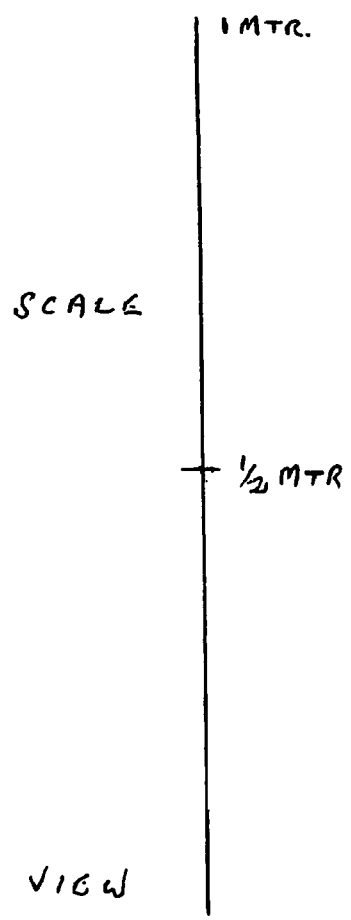

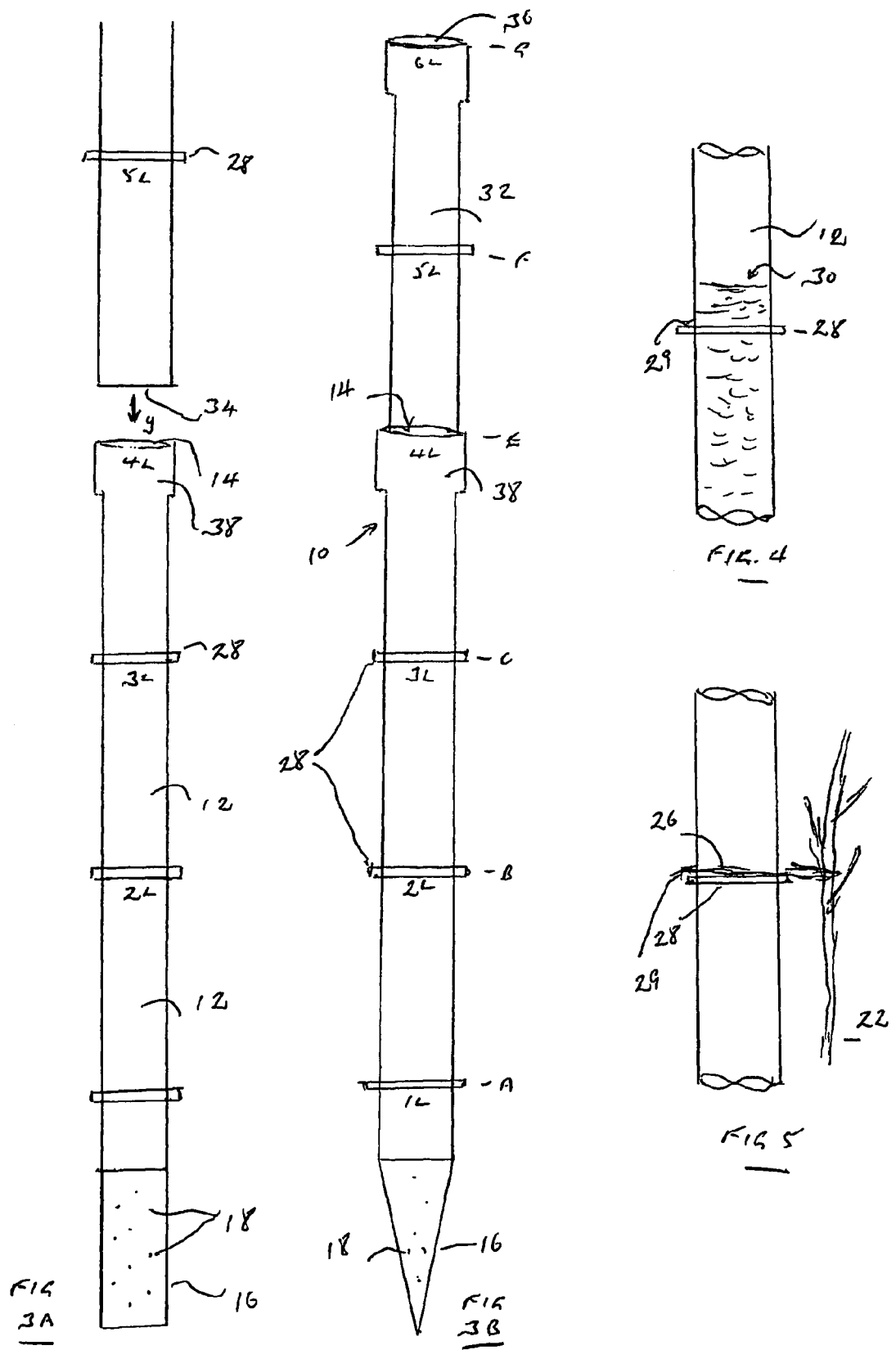

PLANT WATERING AND FEEDING DEVICE

This invention relates to device for watering and feeding plants, and relates particularly, though not exclusively, to a plant watering and feeding device which can be used to supply water and/or fertiliser to plants at root level, and which can also be used as a stake for providing support to plants as they grow.

Traditionally plants are provided with water and fertiliser at ground level. As water and feed must penetrate earth or plant soil in order to reach the roots of plants, soil and/or environmental conditions can affect the overall supply of nutrients to a plant. If the soil is hard, or if the external environment is warm or the plant is in direct sunlight, a significant amount of nutrients can be lost due to evaporation or poor drainage. For this reason some plants require watering up to two times a day to provide sufficient nutrients to encourage plant growth. In times of drought, watering of plants twice a day can be perceived as excessive or undesirable. In instances where plants are dusted with fertiliser at ground level, wind or watering can blow or wash away this fertiliser, minimising the effectiveness thereof. Run-off of fertiliser or pesticide due to watering also poses an issue due to the effects the same can have on the surrounding environment.

It is therefore an object of the present invention is to provide a device for watering and feeding plants which can supply water and/or fertiliser to the root vicinity of plants surrounded by earth or plant soil.

With these objects in view the present invention in one aspect may provide a plant watering and feeding device including an elongate tubular body having an upper portion and a lower portion, said elongate tubular body defining a hollow cavity for receiving water and feed therein, said upper portion having an opening in fluid communication with said hollow cavity for supplying said water and feed into said device, said lower portion having a plurality of through-extending apertures in fluid communication with said hollow cavity and the exterior of said device, wherein said device is positionable relative to a plant such that said lower portion of said device is surrounded by soil proximate the roots of said plant, and wherein said water and feed may be introduced into said device through said opening and subsequently slowly released into said soil proximate said roots of said plant via said apertures.

Preferably said tubular body is cylindrical and is constructed out of a transparent plastics material to permit a visual inspection of the level of said water and feed within said hollow cavity of said device. Said transparent tubular body providing a means of gauging the amount of water and feed introduced into said device to facilitate visualisation of the amount of nutrient being supplied to said plant.

It is further preferred that said lower portion of said device terminates in a point in order to facilitate ease of introduction of said device into said soil proximate said plant by the application of an appropriate downward force on said device.

Tapered wedge shaped bottom increases stability.

In a practical preferred embodiment said tubular body is provided with a number of fluid level rings or markings arranged at appropriate spaced intervals on the outer surface of said tubular body of said device. Said fluid level rings each representing a measured level of the contents of said device in any appropriate scale, such as, for example, literss, wherein a person supplying water and feed into said device may do so until a desired level is reached by visually monitoring the internal level until the same reaches one of said fluid level rings.

In a further practical embodiment said device is used instead of a supporting stake for plants requiring support, such as, for example, tomatoes, capsicums or the like, wherein said device may be positioned proximate a plant and said plant can be tied to said device for support by means of string, ties or the like. Preferably said fluid level rings protrude outwards from said outer surface of said device. Said protruding fluid level rings providing a flange for supporting said string to stop said string from slipping down said outer surface of said device beyond said flange. Said device therefore providing not only water and feed to said plant but also support for the plant as it grows.

In yet a further practical embodiment the length of said device may be extended by way of adding one or more extension-sections to said device to obtain a new desired overall length of said device so that said device may accommodate support for plants of varying in accordance with the invention. The ensuing description is given by way of non-limitative examples only and is with reference to the accompanying drawings, wherein:

FIG. 1 is a perspective view of a plant watering and feeding device made in accordance with a preferred embodiment of the present invention;

FIG. 2 is a perspective view of the plant watering and feeding device of FIG. 1, shown positioned in the ground next to a plant;

FIG. 3a is a perspective view of the plant watering and feeding device of FIGS. 1 & 2, shown with an extension-section arranged ready for attachment to the device;

FIG. 3b is a perspective view of the plant watering and feeding device of FIG. 3a, shown with the extension-section fitted to the device;

FIG. 4 is an enlarged partial view of the plant watering and feeding device of FIGS. 1 to 3b, illustrating a water and feed level gauge of the device; and FIG. 5 is a similar view to that of FIG. 4, showing a plant attached to the device for support.

Referring now to the drawings, wherein like reference numerals correspond to like parts throughout, in FIG. 1 there is shown a plant watering and feeding device 10, including a hollow tubular body 12 of any suitable length, having an upper open end 14 and a lower tapered or pointed end 16. Tubular body 12 may be constructed out of any suitable material, such as, for example, metal, glass or plastics material, or a suitable combination thereof, but is preferably constructed of a cylindrical plastics material which is at least partially transparent in sections so as to permit a visual inspection of the hollow cavity contained therein. Further, although shown as having a tapered or pointed lower end 16, it is to be understood that lower end 16 of device 10 may be constructed in any number of varying ways, for example, lower end 16 may be spiralled so as to provide a means of screwing device 10 into the ground, and as such the invention is not intended to be limited to the specific example as shown.

At the lower section of plant watering and feeding device 10, arranged on and near tapered end 16, are a plurality of apertures 18 which communicate with the hollow cavity of tubular body 12 and extend lengthways around plant watering and feeding device 10 in a spaced relationship. As can be best seen in FIG. 2, apertures 18 permit the flow of water and fertiliser (not shown) from within plant watering and feeding device 10 into the earth or plant soil 20 surrounding a plant 22, in the direction of arrows x.

The design of plant watering and feeding device 10 and the manner of usage of the same is best described with reference to FIG. 2. Here it can be seen that plant watering and feeding device 10 may be positioned in the earth or plant soil 20 proximate a plant 22, such that apertures 18 are arranged relative to the roots 24 of plant 22. Once suitably positioned next to plant 22, an appropriate amount of water and fertiliser (not shown) may be poured or fed into plant watering and feeding device 10, through upper open end 14. Water and fertiliser now contained within plant watering and feeding device 10 may then slowly release into plant soil 20 in the direction of arrows x, proximate roots 24, via apertures 18, so as to provide a means of slowly and continually supplying water and fertiliser to plant 22 around roots 24.

As best seen in FIGS. 2 & 5, plant watering and feeding device 10 may also be used as a stake-like support for attaching plant 22 thereto for bracing as the same grows. Here, a plant 22 requiring support as it grows, such as a tomato plant, may be attached to device 10 by any suitable means, such as string or ties 26 as shown. By doubling as a stake-like support, plant watering and feeding device 10 can be used instead of a conventional stake and can therefore provide an all-in-one means of supporting, watering and feeding plants 22 as they grow.

A further feature of the invention is best seen in FIGS. 2, 3b & 4, where it is shown that plant watering and feeding device 10 is provided with a series of fluid level rings 28. Level rings 28 are formed integral with device 10, or can be secured to device 10 separately via glue or the like, and extend around the periphery of tubular body 12 and protrude outwards therefrom for ease of visualisation and gauging of the water and feed level 30 (FIG. 4) contained within device 10. In use, water and feed can be supplied into plant watering and feeding device 10, through open end 14, until water and feed level 30 reaches a desired level as gauged visually compared to any one of level rings 28.

In FIG. 5 it can be seen that the protruding design of level rings 28 results in a flange or rim 29 upon which string 26 may rest to stop string 26 from slipping down the outer surface of device 10. The inclusion of flanges 29 provided by level rings 28 provides multiple fixed points at which string 26 may be tied to plant 22 and maintained thereabouts. If appropriately tied, string 26 will not slip past flanges 29 as a result of, for example, wind or increase plant weight, as flanges 29 provide a ledge for supporting string 26 which restricts any downward movement of string 26 relative to device 10.

Referring to FIG. 2, where it can be seen that level rings 28 are arranged at a series of marked intervals A to D. In a preferred design, level rings 28, from marking A to marking D, represent an internal level of water and feed within device 10, starting at 1 liter (marking A), up to 4 literss (marking D), with level rings 28 designated by markings B, C, each representing a 1 liter interval therebetween. In the embodiment shown in FIG. 2, the arrangement of level rings 28, represented by markings A to D, is such that the upper most portion of device 10 at open end 14 represents a fifth, or 5 liter, interval E. It is to be understood that any number of level rings 28, each representing any suitable measurement interval, can be provided and as such are intended to be included within the scope of the present invention. The present invention is therefore not intended to be limited to the specific example as shown.

A final feature of the invention can be seen in FIGS. 3a & 3b. Here, first referring to FIG. 3a, it can be seen that a hollow tubular extension-section 32 is arranged ready for application to plant watering and feeding device 10. Extension-section 32 includes a lower open end 34, which forms a mating surface for cooperation with open end 14 of plant watering and feeding device 10, and an upper open end 36. The design of plant watering and feeding device 10 is such that at open end 14, hollow tubular body 12 has an enlarged portion 38, relative to the diameter of the remaining length of tubular body 12, to receive lower open end 34 of extension-section 32. In use, extension-section 32 is fitted to plant watering and feeding device 10 in the direction of arrow y, by way of a frictional connection between respective open ends 14,34, so that a composite plant watering and feeding device 10 results, as shown in FIG. 3b. In composite form, water and feed (not shown) is supplied through open end 36 of extension-section 32 in the same manner in which it would be supplied through open end 14, if extension-section 32 were not fitted to device 10. Accordingly, water and feed is supplied to plant watering and feeding device 10, through open end 36, and travels out through apertures 18 in the direction of arrows x (FIG. 2) in the manner described above. By providing a means of extending the length of device 10, if plant 22 grows, an extension-section 32, or more than one extension-section (not shown), can be added as needed to provide a resultant plant watering and feeding device 10 capable of supporting plants 22 of varying height.

In FIG. 3b, in a preferred design, level ring 28 of extension-section 32, designated by marking F, and open end 36, designated by marking G, both represent further measurement markings in liters of plant watering and feeding device 10. Here, markings F & G, follow-on from markings A to E of FIG. 2, in that the overall composite plant watering and feeding device 10 has markings A to G each representing 1 liter intervals, starting from 1 liter (marking A) up to 7 liters (marking G).

The present invention therefore provides a simple plant watering and feeding device which provides a means of slowly and continually watering and feeding plants in order to provide the required nutrients to encourage plant growth directly in the vicinity of the roots of a plant. By watering and feeding at root level, as opposed to conventional ground level watering and feeding, many advantages are achieved, of which the following are noted. Plants do not need to be fertilised as often, as fertiliser which is traditionally dusted around the ground level of a plant is not being blown or washed away due to the harsh conditions of the environment. Earth or plant soil surrounding a plant is less likely to erode as plants are provided with a constant supply of nutrients directly in the vicinity of their roots as compared to repeated ground level watering which can sometimes lead to soil erosion and exposure of the plant roots which may endanger the plant. Plants can be watered and/or fed at anytime of the day as compared to the orthodox way which can see watering and feeding limited to times of the day when, for example, the sun is low, so as not to burn or severely damage plants by the suns rays. Plants can be fed a vast variety of food, such as pot-ash, directly to the roots and with minimal watering required to supply such food directly to the roots of a plant. Watering and feeding at root level does not generally feed weeds or grasses at ground level and as such does not encourage excessive growth of the same. Lastly and most importantly, root level watering saves water as compared to orthodox watering methods which usually see plants watered twice a day to deliver the same amount of water to the roots as compared to the device of the present invention.

The invention will be understood to embrace many further modifications as will be readily apparent to persons skilled in the art and which will be deemed to reside within the broad height.

In order that the invention may be more clearly understood and put into practical effect there shall now be described in detail preferred constructions of a plant watering and feeding device.

The invention claimed is:

1. A plant watering and feeding device comprising:

an elongate tubular body having an upper portion and a lower portion, said elongate tubular body defining a hollow cavity for receiving water and feed therein, said upper portion having an enlarged end and an opening in fluid communication with said hollow cavity for supplying the water and feed into said device, said lower portion having a tapered end defining a plurality of through-extending apertures in fluid communication with said hollow cavity;

a plurality of fluid level rings arranged at spaced intervals on the outer surface of said tubular body, said fluid level rings protrude outwards from said outer surface of said tubular body, wherein said plurality of fluid level rings indicate the level of fluid in said tubular body;

at least one extension section having an elongated hollow tubular body including an enlarge upper portion and a lower portion adapted to be inserted into said enlarged end of said upper portion of said tubular body; and a plurality of fluid level rings arranged at spaced intervals on the outer surface of said tubular body of said extension section, said fluid level rings protrude outwards from said outer surface of said extension section wherein said plurality of fluid level rings indicate the level of fluid in said tubular body of said extension section;

wherein said device is positionable relative to a plant such that said lower portion of said device is surrounded by soil proximate the roots of the plant, and wherein the water and feed may be introduced into said device through said opening in said enlarged end and subsequently slowly released into said soil proximate the roots of the plant via said apertures in said lower portion;

wherein said tubular body and said extension section are cylindrical and are constructed out of a transparent plastics material to permit a visual inspection of the level of the water and feed within said hollow cavity of said device; at least one tie string adapted rest on any one of said fluid level rings.

2. The plant watering and feeding device according to claim 1, wherein said fluid level rings are positioned to equal about 1 liter volume from said fluid level ring to said next fluid level ring positioned therebeneath or to said lower portion of said tubular bodies.

* * * * *